Figure 1:
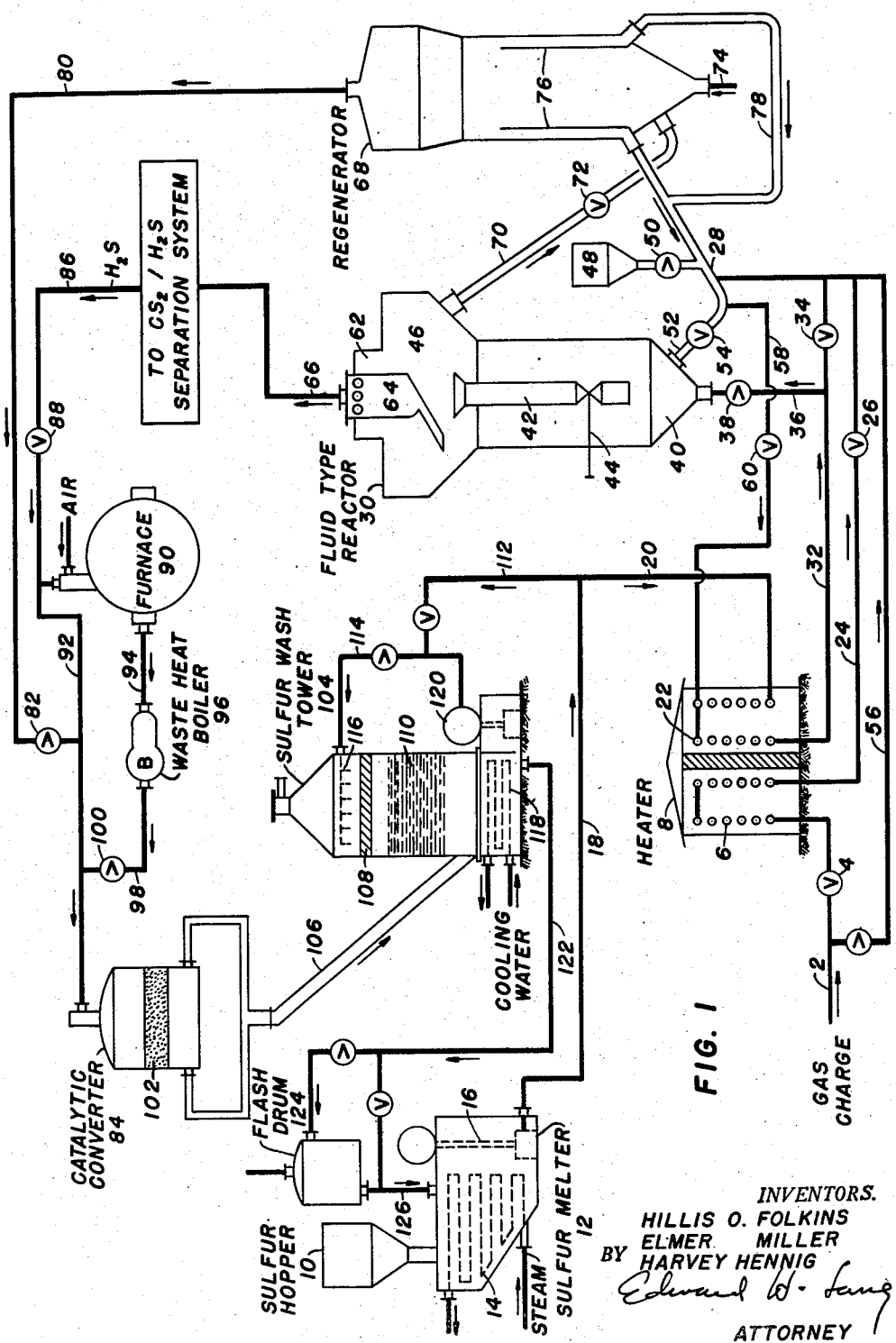

Jan. 19, 1954  H. O. FOLKINS ET AL  2,666,690
PROCESS FOR THE PRODUCTION OF CARBON DISULFIDE
Filed Dec. 28, 1951  2 Sheets-Sheet 1

INVENTORS.
HILLIS O. FOLKINS
ELMER MILLER
HARVEY HENNIG
BY Edward W. Lang
ATTORNEY Jan. 19, 1954     H. O. FOLKINS ET AL     2,666,690
PROCESS FOR THE PRODUCTION OF CARBON DISULFIDE
Filed Dec. 28, 1951     2 Sheets-Sheet 2

INVENTORS.
HILLIS O. FOLKINS
ELMER MILLER
BY HARVEY HENNIG

ATTORNEY

Patented Jan. 19, 1954

2,666,690

UNITED STATES PATENT OFFICE 2,666,690

PROCESS FOR THE PRODUCTION OF CARBON DISULFIDE

Hillis O. Folkins and Elmer Miller, Crystal Lake, and Harvey Hennig, Cary, Ill., assignors to Food Machinery and Chemical Corporation, New York, N. Y., a corporation of Delaware Application December 28, 1951, Serial No. 263,724

18 Claims. (Cl. 23—206)

The present invention is directed to a process for converting hydrocarbons to carbon disulfide by reaction with sulfur wherein a scavenging or agglomerating material is utilized to nullify the deleterious effect of side reaction products.

It is known to prepare carbon disulfide by reaction of sulfur with various hydrocarbons under catalytic conditions at elevated temperatures and pressures. It is reported that hydrocarbons having one to three carbon atoms in the molecule are preferred for the reaction for economic reasons, although certain investigators show that unsaturated hydrocarbons and higher molecular weight hydrocarbons may be satisfactorily used in the process. Because of the complexity of the reaction when using higher molecular weight hydrocarbon charge gases wherein there are produced various side reaction products, it is generally preferable to use methane or a gas comprising high percentages of methane for the reaction. Experiments have indicated that hydrocarbons containing two to five carbon atoms in the molecule are prone to yield deleterious side reaction products which contaminate the carbon disulfide product, cause severe catalyst decline and consequent drop in conversion, and contaminate the recycle sulfur, making its recovery for reuse more difficult. The natural gases containing 4 mole per cent of $C_3$ hydrocarbons and 1 mole per cent or more of $C_4$ hydrocarbons have been designated as borderline charge gases for the carbon disulfide reaction since even these small amounts of hydrocarbons of higher molecular weight than methane have been found to cause severe catalyst contamination and plugging of the reaction zone with tars and polymers.

Numerous techniques have been developed for increasing the efficiency of the reaction and the ease of product recovery. These include new catalysts, use of an excess of sulfur over the stoichiometric requirements, preheating the charge gas and sulfur to reaction temperature or above, and techniques for separating the carbon disulfide from the excess sulfur and side reaction products. These improved techniques have greatly increased the amount of carbon disulfide which can be obtained from a given amount of charge gas. However, in their practice it is not always possible to conduct the reaction under conditions that are kinetically optimum for each hydrocarbon gas. For example, in some instances the space velocities of the reactants through the reaction zone must be adjusted downward from optimum space velocities suitable for the particular reaction environment of hydrocarbon gas and operating conditions used, in order to obtain maximum yields per pass from the reactants. The alternates to lower space velocities are to increase temperature and hence corrosion difficulties or to operate under high pressures. Generally, the use of higher space velocities lowers the extent of conversion. Too low a conversion level will interfere with product separation and recovery. By operating under conditions of lower space velocities, higher conversions to carbon disulfide may be maintained, but the process is more inefficient and productivity may be lower. Naturally, the use of excessive amounts of sulfur complicates the product purification steps and sulfur recovery.

The present process eliminates the above problems without sacrifice of any of the advantages gained from the use of the above mentioned techniques, and is based on the discovery that by removing the deleterious side reaction products as they are formed by use of an agglomerating material present during the reaction, their effect upon the reaction is minimized and the sulfur content thereof is made recoverable. Removal of the side reaction products allows operation at all times under optimum reaction conditions for maximum yield per pass without complicating product recovery or sulfur recycle. This is extremely advantageous in a reaction of this type where the deleterious effects of the sulfur-containing side reaction products increase with time and the presence of even a small amount in the reaction zone is very detrimental.

Accordingly, it is the primary object of this invention to provide a process for producing carbon disulfide by reaction of hydrocarbons with sulfur under conditions of maximum conversion, with a minimum of influence from side reaction products and with little or no difficulty in product recovery or sulfur recycle.

A secondary object of this invention is to provide a process for the efficient and economic production of carbon disulfide from hydrocarbons that are prone to form deleterious sulfur-containing side reaction products wherein an agglomerating material, which may be catalytic or not, acts to remove these deleterious side reaction products from contact with the reactants before there has been an opportunity for them to lower the reaction efficiency.

Another object of this invention is to take advantage of the unreacted sulfur content and the combined sulfur content within the effluent products, removed by the agglomerating material, to react with a principal by-product, hydrogen sulfide, from the reaction, thus reforming in usable condition sulfur which would otherwise be lost.

Still another object of this invention is to provide a process for producing carbon disulfide wherein an agglomerating material removes the tars, polymers, some of the excess sulfur, and sulfur-carbon complexes for oxidation to substantial amounts of sulfur dioxide, which is utilized to react with the hydrogen sulfide by-product to form elemental sulfur for reuse in the reaction.

Further objects and advantages of the invention will become apparent as the description thereof proceeds.

The term "principal products" as used herein applies to the carbon disulfide and hydrogen sulfide which are the normal products of the complete reaction of sulfur and charge gas. The term "side reaction products" will be used to refer to the products formed from the incomplete sulfur oxidation of the carbon and hydrogen content of the charge gas. These include carbon-hydrogen-sulfur complexes, sulfur-carbon complexes, tars, and coke above referred to.

Figure 2:
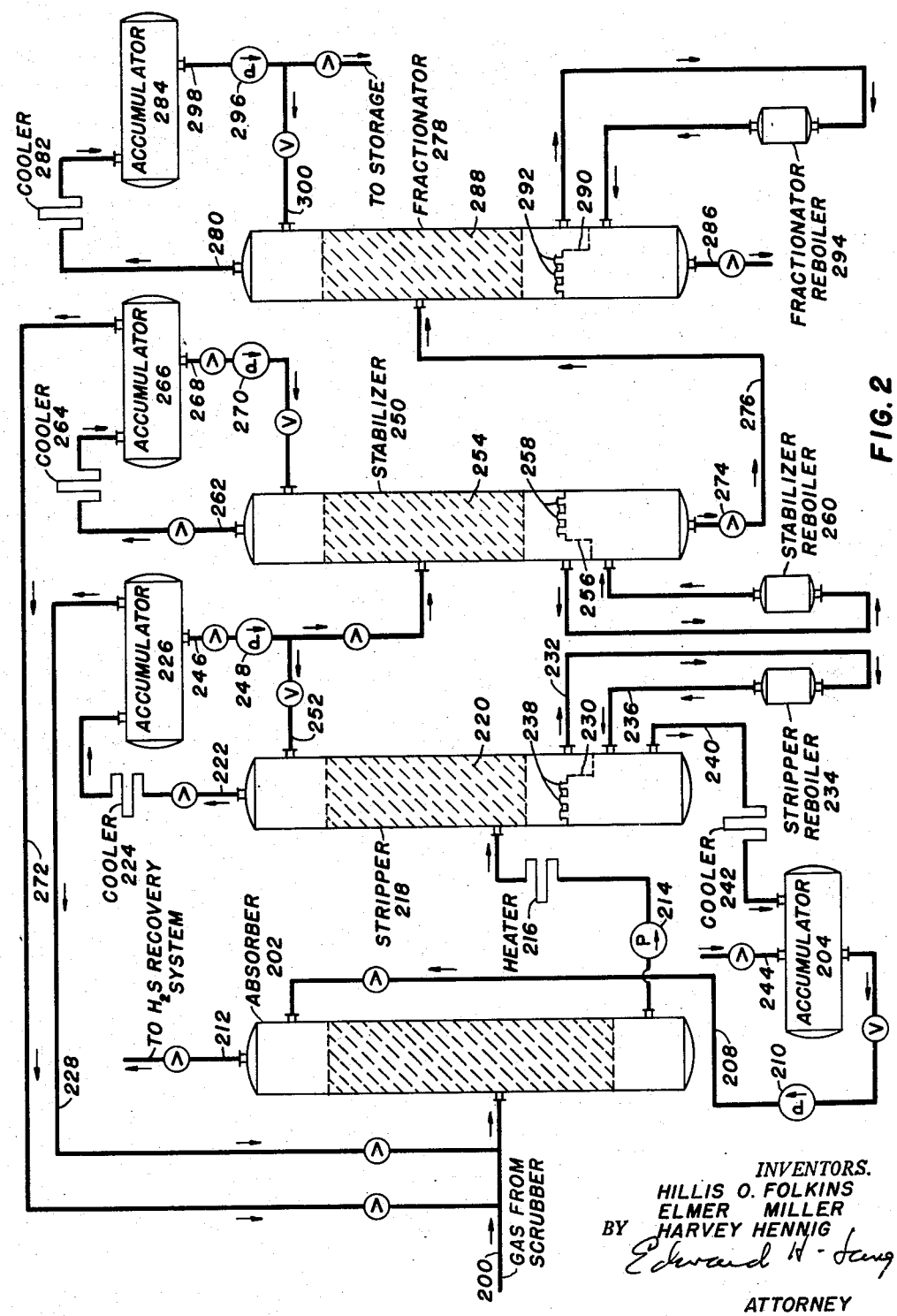

In the accompanying drawings, Figure 1 shows one type of reactor for producing carbon disulfide and a system for oxidizing the hydrogen sulfide to elemental sulfur. Figure 2 shows a system for separating carbon disulfide from hydrogen sulfide and other side reaction products.

The present process is best described by reference to the accompanying drawings. In Figure 1 the charge gas is introduced at line 2, controlled by valve 4, into coil 6 of heater 8 where it is preheated to reaction temperature or above. Elemental sulfur is introduced from sulfur hopper 10 into sulfur melter 12 where it is melted by steam in coil 14. Heat is applied to coil 14 so that the molten sulfur is kept at a temperature between approximately 250° and 300° F. and preferably about 270° F. Obviously, those temperatures are to be avoided at which viscous sulfur forms. The molten sulfur is pumped from the melter 12 by means of submerged centrifugal pump 16, suitable for handling molten sulfur, through lines 18 and 20 into coil 22 of heater 8. Sufficient pressure must be used to force the molten sulfur through coil 22. For this purpose, pressures up to 100 pounds per square inch may be used. The pressures under which the molten sulfur is moved throughout the system will depend upon the operation pressure maintained in the reactor, furnaces, and converters.

That portion of the equipment which is in contact with sulfur-bearing vapors at elevated temperatures is best constructed of a material which is resistant to the corrosive action of sulfur. Various stainless steel alloys, such as those of high chromium content, and chromium-nickel stainless steels stabilized with molybdenum, etc. have proved effective. Other materials of construction include aluminum coated steels, refractory linings, and other types of stainless steels.

In coil 22 of heater 8, the molten sulfur is heated to a sufficiently high temperature to vaporize it, as for example, 850° to 1200° F. under given operating pressures. Preheated charge gas leaves coil 6 by line 24, controlled by valve 26, and passes to line 28 where it joins and fluidizes the agglomerating or catalytic material before entering reactor 30. Sulfur vapors proceed from coil 22 via line 32, controlled by valve 34, to join the charge gas before it enters line 28. Simultaneous introduction of the reactants into contact with each other and into contact with the agglomerating material before their entrance into the reactor is generally the preferred technique. However, in some cases, especially where higher hydrocarbons are being used as the charge stock, it may be preferable to introduce the sulfur vapor to the reactor separately. In this case, the sulfur vapors pass from line 32 to line 36, controlled by valve 38, into reactor 30 where they meet the hydrocarbon gas and fluidized material. Both the preheated charge gas and the vaporized sulfur may be subjected to superheating to reaction temperatures or above prior to their entry into reactor 30.

Reactor 30 is provided with a bottom conical shaped section 40 in which the admixture of preheated sulfur vapors and charge gas takes place. A vertical return standpipe 42 provided with valve 44 for controlling the flow of fluidized mixture therein is located within the central portion of reactor 30. Standpipe 42 extends from lower conical section 40 to upper enlarged conical section 46. "Make-up" agglomerating material is introduced into the system from hopper 48, controlled by valve 50, into line 28 which feeds directly into lower conical section 40 of reactor 30 via line 52, controlled by valve 54. Under certain conditions, it may be desirable to utilize the latent heat content of the regenerated agglomerating material to aid in the vaporization and superheating of the sulfur; for this purpose, the hydrocarbon charge gas, heated or unheated, passes via lines 24 or 56 into line 28 where fluidization of the agglomerating material takes place. The fluidized mixture passes from line 28 via line 58 and valve 60 to join the sulfur stream at a point in coil 22 where the temperature is about the boiling point of sulfur. The heated mixture leaves coil 22 and enters reactor 30 via lines 32 and 36. Contact of the agglomerating material with the reactants takes place in reactor 30 in the same manner as is employed in the moving bed, pebble and Thermofor cracking processes. Standpipe 42 serves to control the flow of heavier particles through the fluidized mass. Conical section 46 is designed so that the maximum hindered settling takes place therein.

Accordingly, reaction products and the fine portion or smaller particles of agglomerating material rise to the small upper section 62 for passage into cyclone separator 64. Cyclone separator 64 serves to separate the fine particles of agglomerating material from the reaction products and return them into the denser phase of the reaction. Reaction products leave the top of reactor 30 via line 66 to pass to the carbon disulfide-hydrogen sulfide separation system to be described in Figure 2. The reaction products may contain considerable amounts of fine sulfur particles and some agglomerating material. This may be removed (in apparatus not shown) by subjecting the product stream to countercurrent contact with cold water followed by mechanical separation of the sulfur and agglomerating material, which is returned to regenerator 68.

Heavier particles of agglomerating material leave the reactor 30 by line 70, controlled by valve 72, to enter the bottom of regenerator 68. Regenerator 68 may be an ordinary furnace type regenerator for oxidizing the agglomerating material to free it from occluded tars, polymers, and sulfur-containing products. The principal products of this oxidation will be sulfur dioxide, carbon dioxide, carbon monoxide, and water. Regenerator 68, as shown in Figure 1, is a fluid type regenerator wherein the oxidizing gas is introduced at line 74. Burning of the agglomerating material takes place throughout the central portion of regenerator 68, and the regenerated material is caught in the annular space defined by inner cylinder 76 and the outer wall of the regenerator for return via lines 78 and 28 to the reactor 30. The cycle of agglomerating material from the reactor into the regenerator and back into the reactor is continuous and conditions are maintained for complete fluidization throughout the system.

Gaseous oxidation products from regenerator 68 pass through line 80, controlled by valve 82, to catalytic converter 84 for the next step in the operation comprising the recovery of sulfur therefrom. On a molar basis, for each mole of hydrocarbon gas reacting with four moles of sulfur, there are produced one mole of carbon disulfide and two moles of hydrogen sulfide. One mole of sulfur dioxide will be required to convert the two moles of hydrogen sulfide to free sulfur. Since from the carbon disulfide reaction there will be produced in the form of tars and polymers admixed with unreacted sulfur, an amount up to about 0.5 mole of sulfur, in combined and uncombined form, which will yield an equivalent number of moles of sulfur dioxide in the regenerator, there will be an excess of hydrogen sulfide to be oxidized by the sulfur dioxide. Consequently, a portion of the hydrogen sulfide ranging from one-tenth to one-third is oxidized to form additional sulfur dioxide for the reaction. For this purpose, hydrogen sulfide from the separation system (described in Figure 2) is conducted through line 86, controlled by valve 88, to furnace 90 wherein it is oxidized to sulfur dioxide. The reaction taking place in furnace 90 is exothermic, and advantage is taken of this to preheat the incoming hydrogen sulfide and air within the furnace itself. Furnace 90 may be packed with high temperature fire brick. Preheating the entire furnace by burning natural gas therein may be necessary in order to bring it to operating temperature before the reactants are introduced. By-pass line 92 is provided to conduct the balance of hydrogen sulfide to the catalytic converter 84. The mixture of sulfur dioxide and water formed in furnace 90 is conveyed by line 94 to waste heat boiler 96 wherein they are cooled before passage to catalytic converter 84 by line 98, controlled by valve 100.

The final step in the sulfur recovery comprises complete reaction of the sulfur dioxide content from the regenerator 68 and furnace 90 with the balance of hydrogen sulfide to form elemental sulfur. This is accomplished by means of catalytic converter 84 where in the reactant gases pass downward through catalyst bed 102. The catalyst for this purpose may be coarse Porocel, a high-iron activated bauxite which is supported on a stainless steel screen resting on a cast iron grate. Normally the operating conditions within converter 84 are from 500° to 750° F. The reaction may be caused to take place in one or more stages. For example, the first stage may be maintained at about 750° F. and the second stage at about 500° F. If necessary, heat may be applied to the reactor in order to initiate the reaction. The conditions within converter 84 are subject to some variation as long as the complete oxidation of the sulfur takes place.

Effluent gaseous products from the converter are admitted at the bottom of sulfur wash tower 104 by means of line 106. Sulfur wash tower 104 is provided with a mist separating section 108 and a suitable contact area 110. Within the tower the gases are subjected to countercurrent contact with a stream of molten sulfur conveyed from sulfur melter 12 via lines 18, 112, and 114 through spray 116. Molten sulfur accumulates in the bottom of sulfur wash tower and any heat absorbed from the hot gases or from the condensation of the sulfur vapor is removed by indirect heat exchange through cooling coil 118. Pump 120 serves to recycle molten sulfur to spray 116 when sufficient sulfur has accumulated in the bottom of tower 104. When the process has reached this point, the recycling of sulfur through line 112 may be discontinued. Excess sulfur is withdrawn through line 122 and passed to flash drum 124. Flash drum 124 eliminates the occupational hazard in sulfur melter 12 due to absorbed hydrogen sulfide by flashing it off at atmospheric pressure. The sulfur within flash drum 124 is returned to sulfur melter 12 by line 126.

Referring now to Figure 2, the carbon disulfide separation system, reaction products enter through line 200 into the lower portion of absorber 202. The absorber is fitted with Raschig rings or other liquid-gas contacting elements. Absorber 202 is preferably maintained at a pressure of approximately 20 to 50 pounds per square inch gauge in order to absorb carbon disulfide from the reaction product gases. Lean oil is pumped into the top of the absorber from accumulator 204 through line 206 by means of pump 210. As absorber oil, heptane, or petroleum naphtha having a boiling range of about 250° to 400° F. or other fraction boiling above the boiling point of carbon disulfide may be used. Other solvents or absorbing mediums such as benzene and o-dichlorobenzene may be used. It is preferable to choose an absorber oil which has a boiling point or boiling range not too far above the boiling point of carbon disulfide in order to enable the latter to be readily stripped therefrom. However, heavier absorption oils may be used and stripping carried out with the aid of a stripping medium such as steam, methane, or other inert gas. The unabsorbed gas leaves the top of the absorber through line 212 and passes to furnace 90 and catalytic converter 84 of Figure 1. This gas is composed of hydrogen sulfide with a small amount of hydrocarbon gas and about 0.5 per cent or less of carbon disulfide. The rich oil is withdrawn from the bottom of absorber 202 by means of pump 214, passed through steam heater 216 where the rich oil is preheated to a suitable temperature, as, for example, 200° to 350° F., and charged to the middle section of stripper 218. Stripper 218 is provided with Raschig rings 220 or other liquid-gas contact elements. Carbon disulfide is stripped from the absorber oil and passed from the top of the stripper through line 222, water cooler or condenser 224, where the temperature is reduced to 100° F. or less, to accumulator 226. Any gas and/or vapor which remains uncondensed leaves the accumulator 226 through line 228 and is returned to the inlet of the absorber 202 through line 228. The stripper 218 is preferably operated at a pressure slightly above the pressure in the absorber 202, as, for example, 25 to 55 pounds per square inch gauge, in order to avoid the necessity of compressing the gas returned through line 228.

The absorber oil is withdrawn from the plate 230 in the bottom portion of stripper 218 through line 232 and charged to reboiler 234 and thence returned through line 236 to the section of the stripper below the plate 230. Plate 230 is provided with vapor uptakes 238. Lean absorber oil is withdrawn from the bottom of stripper 218 through line 240, cooled in water cooler 242 to a temperature below 100° F., and returned to accumulator 204. It will be apparent that the rich oil from absorber 202 can be used to partially cool the lean oil from stripper 218 by providing a suitable heat exchanger. Fresh absorber liquid is added to accumulator 204 as required through line 244.

Liquid carbon disulfide is withdrawn from accumulator 226 through line 246 and charged by means of pump 248 to stabilizer 250. A portion of the carbon disulfide may be pumped through line 252 to the upper portion of stripper 218 as reflux. The stabilizer 250 is operated at pressures of 20 pounds per square inch gauge or above, and preferably in the ranges of 50 to 150 pounds. The temperature in the bottom of the stabilizer is that needed to effectively boil the carbon disulfide and free it of hydrogen sulfide and hydrocarbon gas under the conditions of operation. The stabilizer 250 is equipped with contact surfaces 254, such as Raschig rings, with a plate 256 having vapor uptakes 258 and a reboiler 260. In the stabilizer 250, any hydrogen sulfide or hydrocarbon gas absorbed in the carbon disulfide is boiled off and passes overhead through line 262 through water cooler 264. A small amount of carbon disulfide passes overhead, is condensed in part in cooler 264, and collected in accumulator 266. The condensate from accumulator 266 is returned to the top of the stabilizer through line 268 by means of pump 270. The uncondensed gases and vapors are withdrawn from the accumulator 266 through line 272 and recycled to the inlet of absorber 202 through line 200. The bottoms from the stabilizer 250 are withdrawn through a pressure control valve 274 and charged through line 276 with the necessary heating or cooling, to the middle portion of fractionating column 278 from which the carbon disulfide is taken overhead through line 280, condensed in water cooler 282 and collected in accumulator 284 as finished product. Any bottoms, such as absorption oil, which may have passed overhead with the carbon disulfide from stripper 218 are withdrawn from the bottom of the fractionator 278 through line 286. Fractionator 278 is equipped with contact surfaces 288, such as Raschig rings, a separator plate 290 having vapor uptakes 292 and a reboiler 294. Fractionator 278 is preferably operated at atmospheric pressure. The finished carbon disulfide is withdrawn from the accumulator 284 by means of pump 296 through line 298 to storage. A portion of the carbon disulfide may be recirculated through line 300 as reflux to the top of the fractionator 278.

Having thus described the apparatus useful in carrying out the invention, attention is now directed to the reactants, the general reaction conditions, and the techniques employed in both the thermal and catalytic aspects of the invention, in addition to pointing out specific examples of the process.

The charge gas of the present process will comprise any mixture of hydrocarbons which contain small amounts, that is, borderline amounts, of constituents which are prone to form deleterious side reaction products, to larger amounts of these constituents. A typical hydrocarbon comprises a natural gas containing in excess of one mole per cent of $C_4$ and higher molecular weight hydrocarbons or more than four mole per cent of $C_3$ and higher molecular weight hydrocarbons. Heavier gases including propane, butane, and even unsaturated higher molecular weight hydrocarbons may be used. The agglomerating material, as has been stated, may be either catalytic or non-catalytic. If the material is non-catalytic, the reaction is conducted under substantially thermal conditions and the agglomerating material used may comprise sintered alumina, silica, diatomaceous earth, and pumice. Such materials should have a particle size sufficient to pass through a 100 to 200 mesh screen in order that they may be properly fluidized. If a moving bed process is used, the pellets may measure from 1/8 inch to 3/8 inch. In conducting the thermal reaction, the purpose of the inert agglomerating material is to "scavenge" the tarry and polymer-containing by-products, and for this purpose only a relatively small amount of inert material in relation to the amount of charge reactants is necessary. Generally, the amount of agglomerating material will need to be sufficient to occlude all of the tarry products inherently present in the hydrocarbon charge under the operating conditions employed. Generally, this amount will vary from about five to fifty weight per cent based on the total weight of charge reactants.

The thermal reaction may be conducted at from about 842° to 1650° F. Although hydrocarbons higher in molecular weight than methane will react thermally with sulfur vapor at comparatively moderate temperatures, this technique requires long contact times and, as a consequence, dehydrogenation and tar formation reactions are increased relative to that of carbon disulfide formation. At more elevated temperatures where the rate of carbon disulfide reaction is rapid, these side reactions will be minimized and any previously dehydrogenated products that may have formed will react with sulfur to form additional amounts of carbon disulfide. For these reasons, the preferred thermal reaction temperature ranges from 932° F. to 1500° F. with adequate residence time within the reaction zone for carbon disulfide formation. These reaction or residence times will vary according to the temperature employed and according to the type of hydrocarbon charge gas used. The preferred reaction times are in the order of 0.5 to 25 seconds under atmospheric pressure conditions. When higher pressures are used, the reaction times will be relatively increased. Since unsaturated hydrocarbons react more readily than saturated hydrocarbons, with other factors being equal, the reaction time for the former will be lessened.

Several catalytic materials are available which will serve to both promote the reaction and, when used according to the methods outlined here, will serve to remove deleterious side reaction products. These materials include synthetic silica-alumina, silica gel, fuller's earth, bauxite, activated alumina, and in general those types of clays which are effective in the removal of color bodies and gum-forming bodies from petroleum oils. These catalysts may be used alone or in combination with one or more compounds of metals of groups IV, V, VI, VII, and VIII of the periodic table as promoters. The oxides of zirconium on silica gel or activated carbon are especially effective catalysts. Oxides of titanium and thorium may likewise be used. In addition, the oxides and sulfides of iron, vanadium, chromium, molybdenum, and manganese may be used as promoters in combination with silica gel, fuller's earth, or activated alumina catalysts.

When conducting these reactions catalytically, lower temperatures may be employed, the preferred range being from 842° F. to 1300° F. For both the catalytic and thermal reactions, it is preferred to use about the stoichiometric amount of sulfur needed to react with all of the carbon and hydrogen of the hydrocarbon to form carbon disulfide and hydrogen sulfide. The ratio of sulfur to hydrocarbon charge gas may, however, vary considerably and it is preferred to operate with an amount of sulfur between 10 per cent in excess of stoichiometric requirements and 10 per cent below stoichiometric requirements. Within this range, reactions leading to the formation of low boiling sulfur compounds such as mercaptans and alkyl sulfides are minimized and at the same time the amount of recycle sulfur that would have to be regenerated with the tarry products is limited to a reasonable amount. Although the reaction has been described through the use of the fluidized technique, other methods may be used to circulate the catalyst or agglomerating material through the system. These include moving bed methods such as those employed in pebble heaters and in Thermofor cracking processes. Another procedure consists in mixing the agglomerating material to form a slurry with the liquid sulfur to be charged to the reactor. An alternate procedure comprises fluidizing the agglomerating material with the sulfur vapors at a point after vaporization and before or during the super-heating of the sulfur. A preferred feature of the thermal technique is to separately preheat the sulfur vapors and hydrocarbon charge gas up to reaction temperatures and then combine these preheated streams immediately prior to their entrance into the reaction zone. This procedure overcomes the dehydrogenating effect of hot sulfur on the hydrocarbons with subsequent coke formation.

Whether thermal or catalytic, the reaction conditions and proportions of reactants may vary somewhat depending on the type of charge gas employed. Based on reaction conditions of about 1112° F. and atmospheric pressures the weight ratio of agglomerating material to charge gas may vary from 1:1 to 20:1 with the preferred range being 2:1 to 10:1 and the median about 5:1. This may be based on either a 10 per cent deficiency or 10 per cent excess of sulfur based on stoichiometricity.

The regeneration of used agglomerating material is effected by suspension of the particles in an oxygen-containing gas and passage of the suspension through a regeneration zone under conditions adapted to cause combustion of the occluded tars and polymers collected on the surface thereof during contact with the reaction mass. The temperature of the regeneration may be controlled by recycling into the regeneration zone a portion of the regenerated agglomerating material after this portion has been cooled to a suitable temperature in a cooling zone extraneous of the regeneration zone. The quantity of cooled recycled agglomerating material is dependent upon its temperature, and decreases with decrease in temperature of the cooled recycled material stream. Common practice is to withdraw the cooling material stream from the dense phase of the mass within the regeneration zone, cool it to the desired cooling temperature and recycle it to the regeneration zone.

It is apparent from the description thus far that the method of operation of this invention permits the continuous efficient conversion of higher molecular weight hydrocarbons into carbon disulfide. By operating in accordance with the invention, these higher hydrocarbons are reacted almost quantitatively to carbon disulfide with continued high catalyst activity throughout the reaction. This is inherent in the process since the reactants are continually being contacted with fresh or regenerated agglomerating material under either thermal or catalytic conditions and the agglomerating material is continuously removing the deleterious side reaction products from contact with the reactants during their combination to form carbon disulfide and from the atmosphere of the reaction. The sensible heat carried by the regenerated agglomerating material, when recycled back into the liquid sulfur stream, will aid in the vaporization of the sulfur and its subsequent superheating. The present method also provides an efficient means for the reclamation of the sulfur content of the tar or free sulfur admixed or in solution with the tar for recycling in the process. Lastly, sensible heat is provided for the reaction itself under endothermic conditions of operation.

The following examples are given to illustrate the invention:

*Example 1.*—Substantially pure ethane gas was reacted with a stoichiometric amount of sulfur vapors at 1112° F. in a fixed bed reactor. Initially only a small amount of tar formation was experienced. However, after a few hours, conversion to carbon disulfide had declined from its initial level of 90 per cent to a value in the order of 20 per cent, and it was necessary to reactivate the catalyst.

*Example 2.*—A natural gas containing 91 per cent methane, 5 per cent ethane, 2 per cent propane, 1 per cent of C4 hydrocarbons, 0.5 per cent of pentanes and 0.5 per cent hexanes and heavier hydrocarbons was passed at substantially atmospheric pressure into a reaction zone maintained at a temperature of 1112° F. and fitted with a static bed of silica gel catalyst. Employing a stoichiometric ratio of gas and sulfur at a total space velocity of 450 (gas and sulfur (S2) volume calculated at 0° C. and 760 millimeters of mercury), a conversion of 58 per cent of the hydrocarbon gas to carbon disulfide was obtained. It was found under these conditions that competing side reactions occurred to such an extent that about 2 per cent of the charged gas reacted with the sulfur to yield a viscous tarry polymeric material and some coke, with the result that a material decrease in over-all efficiency and catalytic activity followed. Recovered sulfur was around 40 per cent of that charged. An initial high conversion of around 76 per cent was attained for a period of about one hour after which conversion dropped gradually and after about six hours' operation, conversion leveled off at about 58 per cent.

*Example 3.*—A natural gas containing around 3.0 per cent of C₄ hydrocarbons and heavier is passed through a fluid reactor using the fluid technique in the presence of the same agglomerating material or catalyst as used in Example 2. The reactor is maintained at 1112° F. under substantially atmospheric pressure conditions. The sulfur to gas ratio is controlled to approximately stoichiometric requirements. The weight ratio of catalyst to natural gas is maintained at about 6:1, and the contact time is about ten seconds. The over-all conversion of the hydrocarbon gas over a period of 12 hours will be about 90 per cent, of which 88 per cent appears as carbon disulfide and 2 per cent as tar. Ten per cent of the natural gas remains unreacted and substantially 10 per cent of the sulfur is unreacted.

From the above examples, it is seen by employing the technique of the present invention the deleterious effect of side reaction products is eliminated and the overall reaction efficiency is maintained at a high level. Although the invention has been described by specific embodiments, these are only illustrative and the only limitations to be placed on the invention are found in the appended claims.

What is claimed is:

1. The method of converting hydrocarbons to carbon disulfide by reaction with sulfur, said hydrocarbons containing constituents tending to form tarry sulfur-containing by-products, comprising passing preheated hydrocarbons and preheated sulfur vapors into contact with an agglomerating material in a reaction zone, said agglomerating material being capable of occluding said sulfur-containing by-products and said reaction zone being maintained under conditions to promote the formation of carbon disulfide and hydrogen sulfide, separating said agglomerating material and the carbon disulfide and hydrogen sulfide so formed, subjecting said agglomerating material to an oxidizing atmosphere capable of oxidizing the sulfur content of said occluded by-products to sulfur dioxide, and reacting said sulfur dioxide so produced with the hydrogen sulfide under conditions to produce elemental sulfur for reuse in the reaction.

2. The method in accordance with claim 1 in which the agglomerating material is selected from the group consisting of sintered alumina, silica, diatomaceous earth, silica gel, activated alumina, activated clays, and silica-alumina compositions.

3. The method in accordance with claim 1 in which the hydrocarbon is selected from the group consisting of natural gas, propane, butane, and their existing olefinic homologues and mixtures thereof.

4. The method in accordance with claim 1 in which the carbon disulfide forming reaction is conducted at a temperature between about 842° F. and 1500° F., and the ratio of agglomerating material to hydrocarbons is in the range of 2:1 to 10:1.

5. The method in accordance with claim 1 in which the hydrocarbons and sulfur are preheated to reaction temperature.

6. The method in accordance with claim 1 in which the sulfur is present in an amount between a 10 per cent deficiency and a 10 per cent excess of stoichiometric requirements for the reaction.

7. The method in accordance with claim 1 in which the oxidation of occluded sulfur-containing by-products on said agglomerating material is conducted at temperatures in the order of 800° F. to 1500° F.

8. The method in accordance with claim 1 in which the reactants and agglomerating material are maintained in a fluidized state within the reaction zone at about 1112° F. under substantially atmospheric pressure with the ratio of agglomerating material to hydrocarbon being maintained at about 6:1 with a contact time of about 10 seconds.

9. The method in accordance with claim 1 in which the sulfur dioxide and hydrogen sulfide are reacted at temperatures from 500° F. to 750° F. in the presence of a catalyst capable of promoting the formation of elemental sulfur.

10. The method of continuously producing carbon disulfide by reaction of hydrocarbons and sulfur, said hydrocarbons containing substantial amounts of constituents tending to form deleterious tarry sulfur-containing by-products comprising, contacting preheated hydrocarbons and preheated sulfur vapors with an agglomerating material in a reaction zone under conditions capable of the formation of carbon disulfide and hydrogen sulfide, said agglomerating material being capable of occluding said sulfur-containing by-products, separating carbon disulfide, hydrogen sulfide, and said agglomerating material from each other, subjecting said agglomerating material to an oxidizing atmosphere capable of producing sulfur dioxide from said occluded by-products, reacting said sulfur dioxide and said separated hydrogen sulfide under conditions capable of forming elemental sulfur.

11. The method in accordance with claim 10 in which the agglomerating material is selected from the group consisting of sintered alumina, silica, diatomaceous earth, silica gel, activated alumina, activated clays, and silica-alumina compositions.

12. The method in accordance with claim 10 in which the hydrocarbon is selected from the group consisting of natural gas, propane, butane, and their existing olefinic homologues and mixtures thereof.

13. The method in accordance with claim 10 in which the carbon disulfide forming reaction is conducted at a temperature between about 842° F. and 1500° F., and the ratio of agglomerating material to hydrocarbons is in the range of 2:1 to 10:1.

14. The method in accordance with claim 10 in which the hydrocarbons and sulfur are preheated to reaction temperature.

15. The method in accordance with claim 10 in which the sulfur is present in an amount between a 10 per cent deficiency and a 10 per cent excess of stoichiometric requirements for the reaction.

16. The method of converting hydrocarbons to carbon disulfide by reaction with sulfur, said hydrocarbons containing constituents tending to form tarry sulfur-containing by-products, comprising passing preheated hydrocarbons and preheated sulfur vapors into contact with an agglomerating material in a reaction zone, said agglomerating material being capable of occluding said sulfur-containing by-products and said reaction zone being maintained under conditions to promote the formation of carbon disulfide and hydrogen sulfide, separating said agglomerating material and the carbon disulfide and hydrogen sulfide so formed, subjecting said agglomerating material to regeneration in an oxidizing atmosphere.

17. The method in accordance with claim 16 in which the oxidizing atmosphere is an oxygen-containing gas.

18. The method in accordance with claim 16 in which said agglomerating material is a catalyst capable of promoting the formation of carbon disulfide from said hydrocarbons and sulfur.

HILLIS O. FOLKINS.
ELMER MILLER.
HARVEY HENNIG.

References Cited in the file of this patent

UNITED STATES PATENTS

| Number | Name | Date |
| --- | --- | --- |
| 2,187,393 | De Simo | Jan. 16, 1940 |
| 2,330,934 | Thacker | Oct. 5, 1943 |
| 2,389,810 | Odell et al. | Nov. 27, 1945 |
| 2,480,639 | Ferguson | Aug. 30, 1949 |
| 2,487,039 | Belchetz | Nov. 8, 1949 |
| 2,530,243 | Holder | Nov. 14, 1950 |
| 2,556,177 | Gamson | June 12, 1951 |